(12) United States Patent
Oya

(10) Patent No.: US 11,152,629 B2
(45) Date of Patent: Oct. 19, 2021

(54) FUEL CELL METHOD FOR DETERMINING FUEL GAS QUALITY FOLLOWING FILLING OPERATION

(71) Applicant: TOYOTA JIDOSHA KABUSHIKI KAISHA, Toyota (JP)

(72) Inventor: Ryosuke Oya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 16/527,760

(22) Filed: Jul. 31, 2019

(65) Prior Publication Data

US 2020/0075973 A1 Mar. 5, 2020

(30) Foreign Application Priority Data

Sep. 3, 2018 (JP) .............................. JP2018-164369

(51) Int. Cl.
| | | |
|---|---|---|
| *H01M 8/04089* | (2016.01) | |
| *H01M 8/2457* | (2016.01) | |
| *H01M 8/04537* | (2016.01) | |

(52) U.S. Cl.
CPC ... *H01M 8/04097* (2013.01); *H01M 8/04552* (2013.01); *H01M 8/2457* (2016.02)

(58) Field of Classification Search
CPC ........... H01M 8/04097; H01M 8/2457; H01M 8/04552
USPC ................................................. 429/410, 415
See application file for complete search history.

(56) References Cited

U.S. PATENT DOCUMENTS

| | | | | |
|---|---|---|---|---|
| 2003/0157383 A1* | 8/2003 | Takahashi | ........... | H01M 8/0668 429/411 |
| 2008/0091629 A1* | 4/2008 | Matsumoto | ....... | H01M 8/04335 706/14 |
| 2015/0346140 A1 | 12/2015 | Kirk et al. | | |
| 2017/0170501 A1* | 6/2017 | Im | ..................... | H01M 8/04455 |

(Continued)

FOREIGN PATENT DOCUMENTS

| | | |
|---|---|---|
| JP | 2013-201872 A | 10/2013 |
| JP | 2015-507326 A | 3/2015 |

(Continued)

OTHER PUBLICATIONS

"Predetermine." Merriam-Webster.com Dictionary, Merriam-Webster, https://www.merriam-webster.com/dictionary/predetermine. Accessed Jun. 8, 2021. (Year: 2021).*

(Continued)

*Primary Examiner* — Sean P Cullen
(74) *Attorney, Agent, or Firm* — Hunton Andrews Kurth LLP

(57) ABSTRACT

The fuel cell system comprises a fuel gas tank, a fuel cell configured to generate electricity with oxidizing gas and fuel gas supplied from the fuel gas tank, a current sensor configured to detect output current from the fuel cell, a voltage sensor configured to detect output voltage from the fuel cell, and a controller. The controller is configured to determine that fuel gas quality does not meet predetermined standard quality when the controller determines output from the fuel cell has decreased using current values detected by the current sensor and voltage values detected by the voltage sensor after filling operation of the fuel gas into the fuel gas tank.

4 Claims, 5 Drawing Sheets

(56) References Cited

U.S. PATENT DOCUMENTS

2017/0331130 A1* 11/2017 Kawase ............ H01M 8/04201
2018/0068497 A1* 3/2018 Kurtz ...................... G01S 19/13

FOREIGN PATENT DOCUMENTS

JP        2018-200900 A     12/2018
KR        101134386 B1 *   4/2012         G03F 7/70341

OTHER PUBLICATIONS

"Desire." Merriam-Webster.com Dictionary, Merriam-Webster, https://www.merriam-webster.com/dictionary/desire. Accessed Jun. 8, 2021. (Year: 2021).*

* cited by examiner

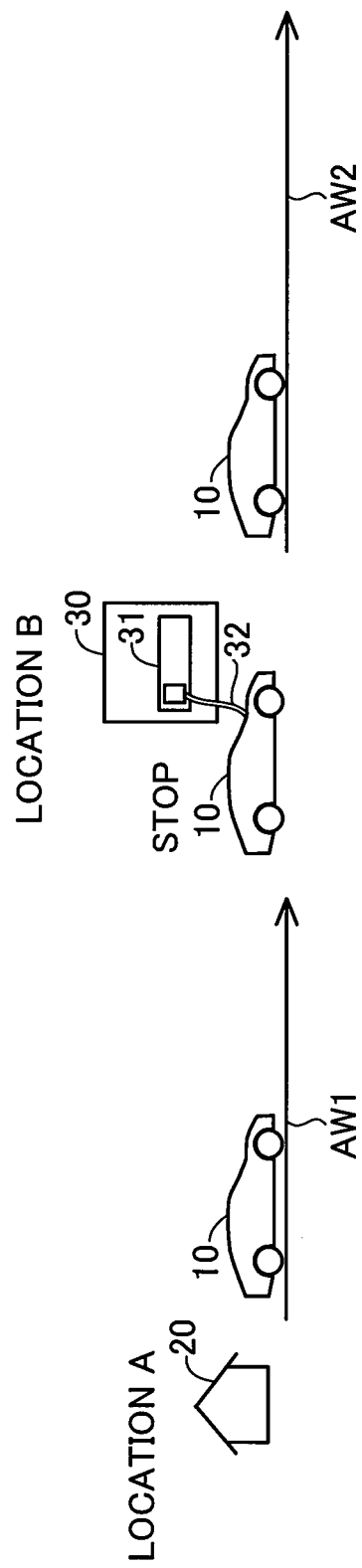

FUEL CELL METHOD FOR DETERMINING FUEL GAS QUALITY FOLLOWING FILLING OPERATION

CROSS-REFERENCE TO RELATED APPLICATIONS

This application claims priority to Japanese Patent Application No. 2018-164369, filed Sep. 3, 2018, the entire disclosure of which is incorporated by reference herein for all purpose.

BACKGROUND

The present disclose relates to a fuel cell system and a method of determining fuel gas quality.

JP 2015-507326A discloses a fuel gas quality monitoring device for monitoring quality of hydrogen (fuel gas) supplied to a fuel cell using a reference fuel cell and a test fuel cell.

However, providing a dedicated fuel gas quality monitoring device prevents reduction of manufacturing costs and size of a fuel cell.

SUMMARY

The present disclose can be implemented in aspects described below.

(1) According to a first aspect, a fuel cell system is provided. The fuel cell system of the first aspect comprises a fuel gas tank, a fuel cell configured to generate electricity with oxidizing gas and fuel gas supplied from the fuel gas tank, a current sensor configured to detect output current from the fuel cell, a voltage sensor configured to detect output voltage from the fuel cell, and a controller. The controller is configured to determine that fuel gas quality does not meet predetermined standard quality when the controller determines output from the fuel cell has decreased using current values detected by the current sensor and voltage values detected by the voltage sensor after filling operation of the fuel gas into the fuel gas tank.

According to the fuel cell system of the first aspect, when the output from the fuel cell has decreased after the filling operation of the fuel gas into the fuel gas tank, it is determined that quality of the filled fuel gas does not meet the standard quality, thereby enabling determination of the quality of the filled fuel gas without disposing a fuel gas quality monitoring device.

(2) In the fuel cell system of the first aspect, the controller may be configured to determine whether the output from the fuel cell has decreased by comparing the current value and the voltage value at normal operation time of the fuel cell system before the filling operation with the current value and the voltage value at the normal operation time of the fuel cell system after the filling operation.

According to the fuel cell system of the first aspect, the controller compares the current values and the voltage values at the normal operation time before and after the filling operation of the fuel gas, thereby enabling more accurate determination of whether the output from the fuel cell has decreased.

(3) In the fuel cell system of the first aspect, the fuel cell system may further comprise a location detector configured to detect a location of the fuel cell system. The controller may be further configured to obtain a filling location where the filling operation has been performed on the fuel cell system from the location detector. If the controller determines that the fuel gas quality does not meet the standard quality, the controller may store the filling location obtained just before the determination.

According to the fuel cell system of the first aspect, the controller stores the filling location obtained just before determining that the fuel gas quality does not meet the standard quality, thereby enabling the fuel cell system to avoid receiving the filling operation of the fuel gas at this filling location again.

(4) In the fuel cell system of the first aspect, the fuel cell system may further comprise a pressure sensor configured to measure pressure in the fuel gas tank. The controller may be further configured to determine whether the filling operation has been performed using pressure values measured by the pressure sensor.

According to the fuel cell system of the first aspect, it is possible to determine whether the filling operation has been performed using pressure in the fuel gas tank.

The present disclose can be implemented in various aspects other than those described above. For example, it may be implemented in aspects such as a method of determining the fuel gas quality and a vehicle equipped with the fuel cell system.

BRIEF DESCRIPTION OF THE DRAWINGS

FIG. 5 is a diagram illustrating movement of a vehicle equipped with the fuel cell system.

DETAILED DESCRIPTION

Figure 1:
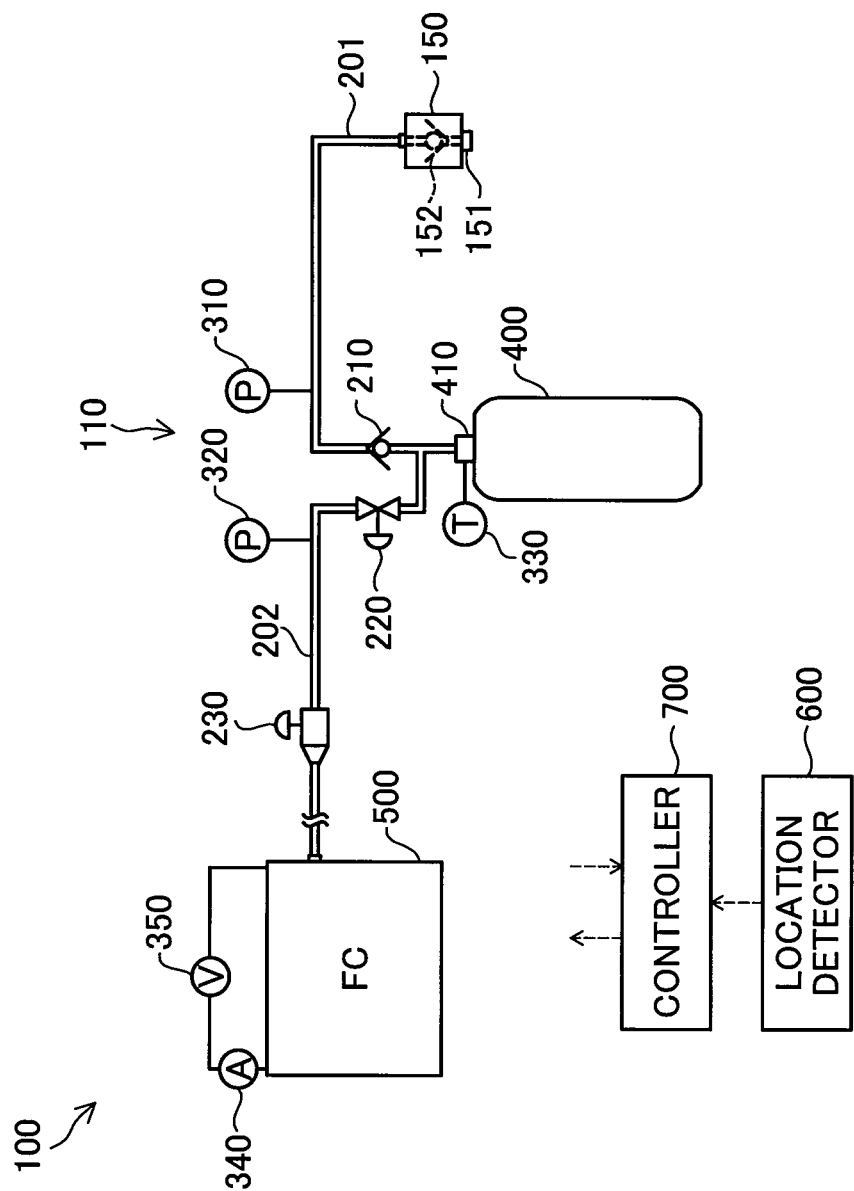
FIG. 1 is an explanatory diagram illustrating a schematic configuration of a fuel cell system according to one embodiment of the present disclose.

FIG. 1 is an explanatory diagram illustrating a schematic configuration of a fuel cell system 100 according to one embodiment of the present disclose. The fuel cell system 100 is installed in a vehicle as a power source, for example. The fuel cell system 100 includes a fuel cell 500, a fuel gas supply system 110, a location detector 600 and a controller 700. In addition, the fuel cell system 100 may also include a cooling system, an oxidizing gas supply system or the like, which are not shown.

The fuel cell 500 includes a plurality of unit cells (not shown) stacked one on top of another. The fuel cell 500 is a polymer electrolyte fuel cell, for example. In addition, the fuel cell 500 may be a solid oxide fuel cell. The fuel cell 500 is supplied with fuel gas and oxidizing gas so as to generate electricity by electrochemical reaction. For example, the fuel gas is hydrogen and the oxidizing gas is air. In addition, the fuel gas may be methane. In such a case, a reformer to reform methane to hydrogen should be included. The fuel cell 500 is connected to a load, not shown, by an electric circuit, not shown, in which a current sensor 340 and a voltage sensor 350 are disposed. The current sensor 340 is configured to detect output current from the fuel cell 500. The voltage sensor 350 is configured to detect output voltage from the fuel cell 500.

The fuel gas supply system 110 includes a fuel gas filler port 150, a fuel gas filling flow path 201, a fuel gas tank 400 and a fuel gas supply flow path 202. One end of the fuel gas filling flow path 201 is attached with the fuel gas filler port 150, while the other end of the fuel gas filling flow path 201 is connected with a ferrule 410 of the fuel gas tank 400.

The fuel gas filler port 150 includes a receptacle 151 and a first check valve 152. The receptacle 151 is an inlet for the fuel gas used in filling operation. The receptacle 151 includes a lid (not shown) to cover the receptacle 151. The first check valve 152 is a valve configured to prevent the fuel gas in the fuel gas filling flow path 201 from leaking outside.

The fuel gas tank 400 is configured to store the fuel gas. The fuel gas tank 400 includes a temperature sensor 330. The temperature sensor 330 is disposed at a valve assembly (not shown) in the ferrule 410 of the fuel gas tank 400, for example. The temperature sensor 330 is configured to measure temperature in the fuel gas tank 400. The temperature sensor 330 may be omitted.

In the fuel gas filling flow path 201, a first pressure sensor 310 and a second check valve 210 are disposed in this order from a side of the fuel gas filler port 150. The first pressure sensor 310 is configured to measure pressure of the fuel gas in the fuel gas filling flow path 201. The second check valve 210 is a valve configured to prevent the fuel gas in the fuel gas tank 400 from leaking outside.

One end of the fuel gas supply flow path 202 is connected to the fuel gas filling flow path 201 adjacent to the ferrule 410 of the fuel gas tank 400 while the other end is connected to the fuel cell 500. In the fuel gas supply flow path 202, a shutoff valve 220, a second pressure sensor 320 and an injector 230 are disposed in this order from a side of the fuel gas tank 400. The shutoff valve 220 is an electromagnetic on-off valve and is configured to switch between an open state and a closed state according to a control signal from the controller 700. The second pressure sensor 320 is configured to measure pressure of the fuel gas in the fuel gas supply flow path 202. The injector 230 is configured to inject the fuel gas toward the fuel cell 500 according to a control signal form the controller 700.

When the fuel gas is filled into the fuel gas tank 400, the fuel cell system 100 is stopped. According to a control signal from the controller 700, the shutoff valve 220 switches to the closed state. The fuel gas supplied from an outside fuel gas supply facility is filled into the fuel gas tank 400 through the fuel gas filler port 150 and the fuel gas filling flow path 201. At this time, a measured value by the first pressure sensor 310 represents a pressure value of the fuel gas in the fuel gas tank 400. On the other hand, when the fuel cell system 100 is in operation, the shutoff valve 220 switches to the open state according to a control signal from the controller 700. The fuel gas in the fuel gas tank 400 is supplied to the fuel cell 500 through the fuel gas supply flow path 202. At this time, a measured value by the second pressure sensor 320 represents a pressure value of the fuel gas in the fuel gas tank 400.

The location detector 600 is configured to detect a location of the fuel cell system 100. For the location detector 600, a navigation satellite system (NSS) is adopted, for example. The location detector 600 receives signals from a plurality of satellites so as to detect the location of the fuel cell system 100 such as latitude and longitude.

For example, the controller 700 includes a microcomputer including a central processing unit (CPU), random access memory (RAM) and nonvolatile memory. The controller 700 may be specifically an Electronic Control Unit (ECU). The controller 700 is configured to control operations of components of the fuel cell system 100 according to a request from a user, measured values by sensors in the fuel cell system 100 or the like. The controller 700 can determine whether quality of the fuel gas filled into the fuel gas tank 400 meets predetermined standard quality. Details will be given later. Note that the "predetermined standard quality" is fuel gas quality that enables the fuel cell 500 to generate electricity at desired output rate, and is defined by hydrogen concentration, for example. Moreover, the controller 700 obtains the location of the fuel cell system 100 from the location detector 600. Note that the nonvolatile memory (not shown) of the controller 700 stores information about locations of fuel gas supply facilities such as hydrogen stations that supply the fuel gas to the fuel cell system 100, in advance. The controller 700 may be configured not to store the information about the locations of the fuel gas supply facilities, but to obtain the information from another component.

First Embodiment

Figure 2:
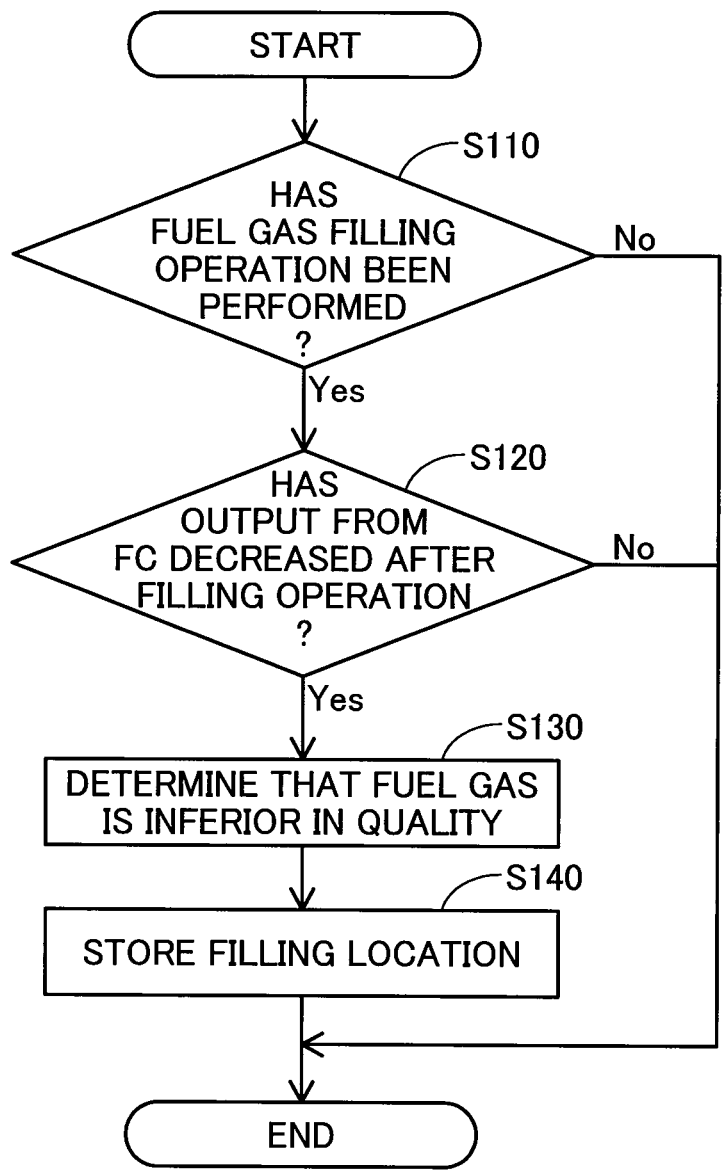
FIG. 2 is a flowchart illustrating a fuel gas quality determination process according to a first embodiment.

FIG. 2 is a flowchart illustrating a determination process of a fuel gas quality determination according to a first embodiment. This determination process is executed when the fuel cell system 100 is started up. Note that the controller 700 is in operation if the fuel cell system 100 is stopped.

In a step S110, the controller 700 determines whether filling operation of the fuel gas into the fuel gas tank 400 has been performed. Specifically, the controller 700 compares pressure values in the fuel gas tank 400 before the fuel cell system 100 is stopped and after the fuel cell system 100 is started up so as to determine whether the filling operation of the fuel gas has been performed. If the fuel gas has been filled into the fuel gas tank 400, the pressure in the fuel gas tank 400 rises. The controller 700 determines that the filling operation of the fuel gas has been performed if the pressure value in the fuel gas tank 400 after a start-up of the fuel cell system 100 is higher than the pressure value in the fuel gas tank 400 before a stop of the fuel cell system 100. On the other hand, the controller 700 determines that the filling operation of the fuel gas has not been performed when the pressure value in the fuel gas tank 400 after the start-up of the fuel cell system 100 is equal to or lower than the pressure value in the fuel gas tank 400 before the stop of the fuel cell system 100. Note that the controller 700 may determine whether the filling operation of the fuel gas has been performed based on whether a state of charge (SOC) of the fuel gas tank 400 has risen. The "SOC of the fuel gas tank 400" is an index representing a filling rate of the fuel gas tank 400 assuming that a fully filled state of the fuel gas tank 400 is 100% and an empty state is 0%. The SOC of the fuel gas tank 400 can be calculated from the pressure value in the fuel gas tank 400, volume of the fuel gas tank 400 and temperature in the fuel gas tank 400 obtained from the temperature sensor 330. Alternatively, the controller 700 may determine whether the filling operation of the fuel gas has been performed by checking a location of a vehicle 10 obtained from the location detector 600 against the stored information about the locations of the fuel gas supply facilities. For example, the controller 700 may determine that the filling operation of the fuel gas has been performed if the lid of the fuel gas filler port 150, shown in FIG. 1, is opened and closed at any one of the locations of the fuel gas supply facilities.

If the controller 700 determines that the filling operation of the fuel gas into the fuel gas tank 400 has been performed in the step S110 (step S110: Yes), the controller 700 proceeds to a step S120. On the other hand, if the controller 700 determines that the filling operation of the fuel gas into the fuel gas tank 400 has not been performed in the step S110 (step S110: No), the controller 700 terminates the determination process. Note that if the controller 700 determines that the filling operation of the fuel gas has been performed, the controller 700 obtains a filling location where the filling operation of the fuel gas has been performed on the fuel cell system 100 from the location detector 600.

In the step S120, the controller 700 determines whether output from the fuel cell 500 has decreased after the filling operation of the fuel gas. Specifically, the controller 700 determines whether the output from the fuel cell 500 has decreased using information about current and voltage, that is, current values and voltage values, of the fuel cell 500 at normal operation time of the fuel cell system 100 before and after the filling operation of the fuel gas. Details will be given with reference to FIG. 3. Note that "after the filling operation" means when the fuel cell system 100 shifts to normal operation and corresponds to when enough electricity is generated to perform the fuel gas quality determination. The "normal operation" means an operational state where the fuel cell 500 generates electricity in a steady state and corresponds to an operational state excluding warm-up operation, intermittent operation, power generating operation with oxidizing gas restrained and the like.

Figure 3:
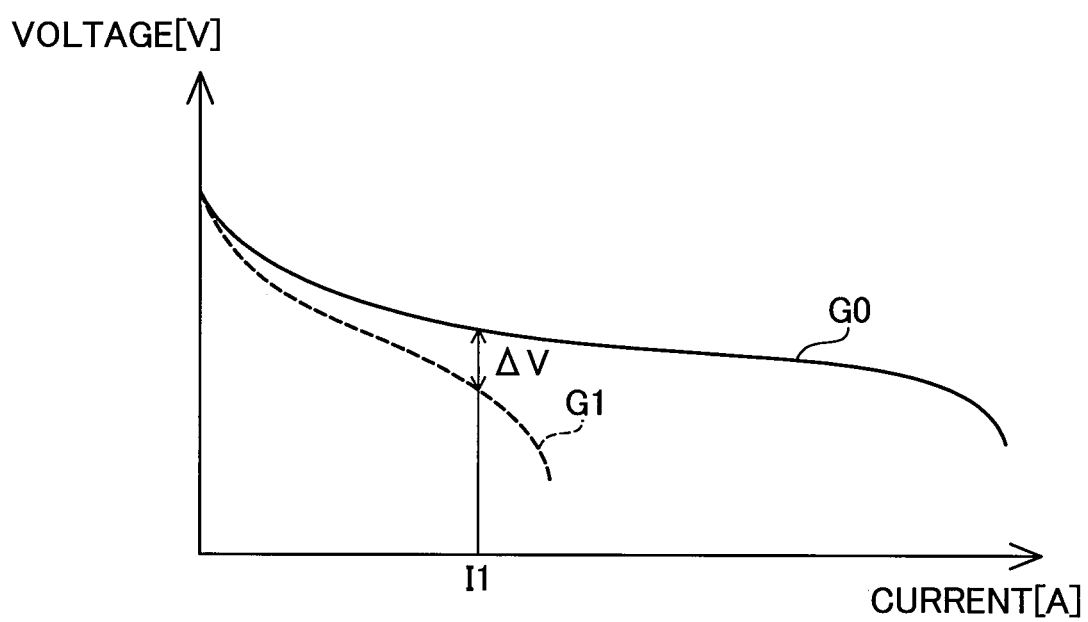
FIG. 3 is a graph illustrating current-voltage characteristic lines of a fuel cell.

FIG. 3 is a graph illustrating current-voltage characteristic lines G0 and G1 of the fuel cell 500. In an example shown in FIG. 3, the current-voltage characteristic line G0 represents a current-voltage characteristic line of the fuel cell 500 at the normal operation time before the filling operation of the fuel gas while the current-voltage characteristic line G1 represents a current-voltage characteristic line of the fuel cell 500 at the normal operation time after the filling operation of the fuel gas. First of all, the controller 700 obtains current values detected by the current sensor 340, shown in FIG. 1, and voltage values detected by the voltage sensor 350, shown in FIG. 1, at the normal operation time of the fuel cell system 100 before and after the filling operation of the fuel gas. For example, the controller 700 obtains a voltage value at every fixed current values several times, and calculates and stores an average value or the highest value of the obtained voltage values. In the example in FIG. 3, the controller 700 stores the voltage values at every fixed current values on the current-voltage characteristic lines G0 and G1. Next, the controller 700 determines whether a difference between the voltage values at a predetermined current value is equal to or higher than a predetermined reference voltage value or whether a sum of differences in the voltage values at a plurality of current values is equal to or higher than another predetermined reference voltage. In the example in FIG. 3, the controller 700 determines whether a difference ΔV between the voltage values at a predetermined current value I1 is equal to or higher than the predetermined reference voltage value. The controller 700 determines that the output from the fuel cell 500 has decreased if the difference ΔV between the voltage values is equal to or higher than the reference voltage value, while the controller 700 determines that the output from the fuel cell 500 has not decreased if the difference ΔV between the voltage values is lower than the reference voltage value.

Meanwhile, if the controller 700 compares voltage values at a predetermined current value in an abnormal operational state, such as an intermittent operation state, before and after the filling operation, a difference between the voltage values caused when the output from the fuel cell 500 has decreased does not appear remarkably, which makes the controller 700 difficult to determine whether the output from the fuel cell 500 has decreased. In the present embodiment, the controller 700 compares the voltage values at the predetermined current value at the normal operation time before and after the filling operation, thereby enabling more accurate determination of whether the output from the fuel cell 500 has decreased. Moreover, the controller 700 may determine whether the output from the fuel cell 500 has decreased comparing current values at a predetermined voltage value at the normal operation time before and after the filling operation. Note that the controller 700 may determine whether the output from the fuel cell 500 has decreased comparing a current value and a voltage value at the normal operation time after the filling operation with a reference current value and a reference voltage value predetermined to determine whether the output has decreased, instead of comparing the current values and the voltage values at the normal operation time before and after the filling operation. However, the controller 700 may determine whether the output from the fuel cell 500 has decreased using a current value and a voltage value in an operational state other than the normal operation. Such a configuration allows the controller 700 to determine whether the output from the fuel cell 500 has decreased before the fuel cell system 100 shifts to the normal operation, and thus the determination can be performed in an earlier stage.

Returning to the step S120 in FIG. 2, if the controller 700 determines that the output from the fuel cell 500 has decreased after the filling operation (step S120: Yes), the controller 700 proceeds to a step S130 and determines that the quality of the fuel gas filled into the fuel gas tank 400 does not meet the standard quality. The decrease of the output from the fuel cell 500 that occurs after the filling operation of the fuel gas is most likely to be inferior quality of the filled fuel gas. Thus, the controller 700 determines that the fuel gas is inferior in quality in the step S130. When the fuel cell system 100 is repaired due to the decrease of the output from the fuel cell for example, such a configuration makes it possible to specify whether the decrease of the output is due to defect of system parts or inferior quality of the filled fuel gas that fails to meet the standard quality. Note that it is possible to more accurately determine whether the quality of the filled fuel gas meets the standard quality based on an amount of the filled fuel gas, according to timing when the decrease of the output from the fuel cell 500 is detected or the like. In a step S140, the controller 700 stores the filling location obtained from the location detector 600 just before determining that the fuel gas is inferior in quality. Such a configuration can prevent the fuel cell system 100 from receiving the filling operation of the fuel gas at that filling location again. In the step S140, the controller 700 may store output current and output voltage from the fuel cell 500, an operational state of the fuel cell system 100, and the like. The controller 700 performs the process in the step S140 and terminates the determination process. Note that the step S140 may be omitted.

On the other hand, if the controller 700 determines that the output from the fuel cell 500 has not decreased in the step S120 (step S120: No), the controller 700 terminates the determination process. In this case, the output from the fuel cell 500 has not decreased after the filling operation of the fuel gas. Thus, it is considered that the quality of the fuel gas filled into the fuel gas tank 400 meets the standard quality.

As mentioned above, according to the first embodiment, if the output from the fuel cell 500 has decreased after the filling operation of the fuel gas into the fuel gas tank 400, it is determined that the quality of the filled fuel gas does not meet the standard quality. Therefore, the quality of the filled fuel gas can be determined without disposing a fuel gas quality monitoring device. In addition, when the fuel cell system is repaired due to the decrease of the output from the fuel cell, it is possible to specify whether the decrease of the output is due to defect of system parts or inferior quality of the filled fuel gas that fails to meet the standard quality.

Second Embodiment

Figure 4:
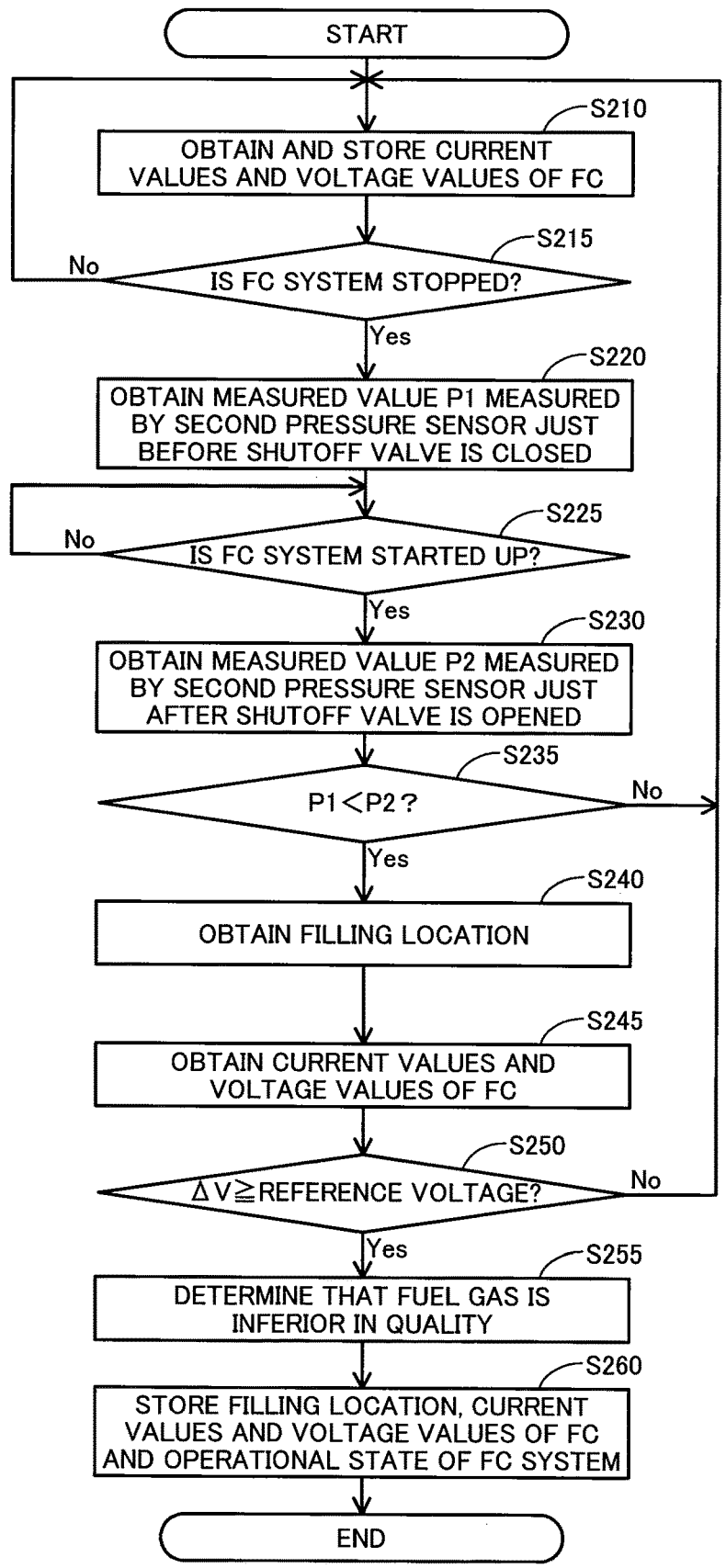
FIG. 4 is a flowchart illustrating a fuel gas quality determination process according to a second embodiment.

FIG. 4 is a flowchart illustrating a fuel gas quality determination process according to a second embodiment. For convenience of explanation, procedures in FIG. 4 are described with reference to FIG. 5. FIG. 5 is a diagram illustrating movement of the vehicle 10 equipped with the fuel cell system 100 shown in FIG. 1. In an example shown in FIG. 5, the vehicle 10 moves from a house 20 that is a starting place at a location A along a direction of arrows AW1 and AW2. A fuel gas supply facility 30 is disposed at a location B in a route of the movement. The fuel gas supply facility 30 includes a gas storage device 31 and a gas supply piping 32. The gas storage device 31 is configured to store the fuel gas. The vehicle 10 receives the filling operation of the fuel gas from the fuel gas supply facility 30.

In a step S210, the controller 700 obtains and stores current values and voltage values of the fuel cell 500 at the normal operation time. This process is performed while the vehicle 10 moves along the arrow AW1 from the location A toward the location B, for example. In a step S215, if the fuel cell system 100 is stopped (step S215: Yes), the controller 700 proceeds to a step S220, and if the fuel cell system 100 is not stopped (step S215: No), the controller 700 returns to the step S210. In the step S220, the controller 700 obtains a first measured valve P1 measured by the second pressure sensor 320 just before the shutoff valve 220 is closed. This process is performed after the vehicle 10 stops at the location B and before receiving the filling operation of the fuel gas from the fuel gas supply facility 30, for example. In a step S225, if the fuel cell system 100 is started up (step S225: Yes), the controller 700 proceeds to a step S230, and if the fuel cell system 100 is not started up (step S225: No), the controller 700 waits for a start-up of the fuel cell system 100 or terminates the fuel gas quality determination process. In the step S230, the controller 700 obtains a second measured valve P2 measured by the second pressure sensor 320 just after the shutoff valve 220 is opened. This process is performed just after the fuel cell system 100 is started up when the vehicle 10 finishes receiving the filling operation at the location B, for example.

In a step S235, the controller 700 compares the second measured value P2 with the first measured value P1 obtained in the step S220. The controller 700 determines that the filling operation of the fuel gas has been performed if the second measured value P2 is higher than the first measure value P1 (step S235: Yes), and proceeds to a step S240. On the other hand, in the step S235, the controller 700 determines that the filling operation of the fuel gas has not been performed if the second measured value P2 is equal to or lower than the first measure value P1 (step S235: No), and returns to the step S210. In the example in FIG. 5, the filling operation of the fuel gas has been performed at the location B and the second measured value P2 is higher than the first measured value P1. Accordingly, the controller 700 proceeds to the step S240 and obtains the filling location where the filling operation has been performed, that is, the location B, from the location detector 600. In a step S245, the controller 700 obtains information about current and voltage of the fuel cell 500 at the normal operation time. This process is performed while the vehicle 10 moves along the arrow AW2, for example.

In a step S250, the controller 700 uses current values and voltage values of the fuel cell 500 obtained before and after the filling operation, that is, in the step S210 and the step S245 so as to determine whether the difference $\Delta V$ between the voltage values at the predetermined current value I1, shown in FIG. 3, is equal to or higher than the predetermined reference voltage value. If the controller 700 determines that the difference $\Delta V$ between the voltage values is equal to or higher than the reference voltage (step S250: Yes), the controller 700 proceeds to a step S255 and determines that the quality of the fuel gas filled into the fuel gas tank 400 does not meet the standard quality. That is, the fuel gas of the fuel gas supply facility 30 at the location B is inferior in quality. Accordingly, in a step S260, the controller 700 stores the location B that is the filling location obtained just before determining that the fuel gas is inferior in quality. After storing the location B as the filling location, the controller 700, for example, reports a warning message to a user so as to prevent the vehicle 10 from receiving the filling operation of the fuel gas again at the fuel gas supply facility 30 at the location B. Such a configuration can prevent the decrease of the output from the fuel cell 500 caused because the quality of the filled fuel gas does not meet the standard quality. Note that the controller 700 stores the current values and the voltage values of the fuel cell 500 and an operational state of the fuel cell system 100 in the step S260. On the other hand, the controller 700 returns to the step S210 if the controller 700 determines that the difference $\Delta V$ between the voltage values is lower than the reference voltage in the step S250 (step S250: No). In this case, the output from the fuel cell 500 has not decreased after the filling operation of the fuel gas. Thus, it is considered that the quality of the fuel gas filled into the fuel gas tank 400 meets the standard quality.

As mentioned above, in the second embodiment, in addition to the procedures in the first embodiment, the controller 700 stores the filling location B obtained just before determining that the fuel gas is inferior in quality, thereby enabling the vehicle 10 to avoid receiving the filling operation of the fuel gas again at the fuel gas supply facility 30 at the location B. Moreover, the controller 700 determines whether the output from the fuel cell 500 has decreased comparing the current values and the voltage values at the normal operation time before and after the filling operation, thereby enabling more accurate determination.

The present disclose is not limited to the embodiments described above, and can be implemented in various ways without departing from the scope of the present invention. For example, the technical features that are described in the embodiments and correspond to the technical features of the aspects described in the SUMMARY section can be replaced or combined as appropriate to partially or entirely solve the problem described above, or to partially or entirely achieve the effects described above. Any of the technical features may be omitted appropriately unless the technical feature is described as essential in the description hereof.

What is claimed is:

1. A fuel cell system mounted on a vehicle comprising:
   a fuel gas tank;
   a fuel cell configured to generate electricity with oxidizing gas and fuel gas supplied from the fuel gas tank;
   a current sensor configured to detect output current from the fuel cell;
   a voltage sensor configured to detect output voltage from the fuel cell;

a pressure sensor configured to measure pressure in the fuel gas tank; and a controller configured to determine that quality of the fuel gas filled into the fuel gas tank does not meet a hydrogen concentration threshold when the controller determines output from the fuel cell has decreased using current values detected by the current sensor and voltage values detected by the voltage sensor after filling operation of the fuel gas into the fuel gas tank, and the controller configured to determine whether the filling operation has been performed using pressure values measured by the pressure sensor.

2. The fuel cell system according to claim 1, wherein the controller is further configured to determine whether the output from the fuel cell has decreased by comparing the current value and the voltage value at normal operation time of the fuel cell system before the filling operation with the current value and the voltage value at the normal operation time of the fuel cell system after the filling operation.

3. The fuel cell system according to claim 1 further comprising a location detector configured to detect a location of the fuel cell system, wherein the controller is further configured to obtain a filling location where the filling operation has been performed on the fuel cell system from the location detector, and when the controller determines that the fuel gas quality does not meet the predetermined hydrogen concentration, the controller stores the filling location obtained just before the determination.

4. A method of determining fuel gas quality, the fuel gas being filled into a fuel gas tank for supplying the fuel gas to a fuel cell, the fuel gas tank and the fuel cell being mounted on a vehicle, the method comprising:

determining whether filling operation has been performed;

determining whether output from the fuel cell has decreased with current values of output current and voltage values of output voltage from the fuel cell;

measuring pressure in the fuel gas tank;

determining the fuel gas quality does not meet a hydrogen concentration threshold when it is determined that the output from the fuel cell has decreased after the filling operation; and wherein the determining whether the filling operation has been performed use pressure values measured by a pressure sensor configured to measure the pressure in the fuel gas tank.

\* \* \* \* \*